Sept. 13, 1927. 1,642,368
L. I. HEINTZ
POST CONSTRUCTION FOR VEHICLE BODIES
Filed Sept. 16, 1925 2 Sheets-Sheet 2

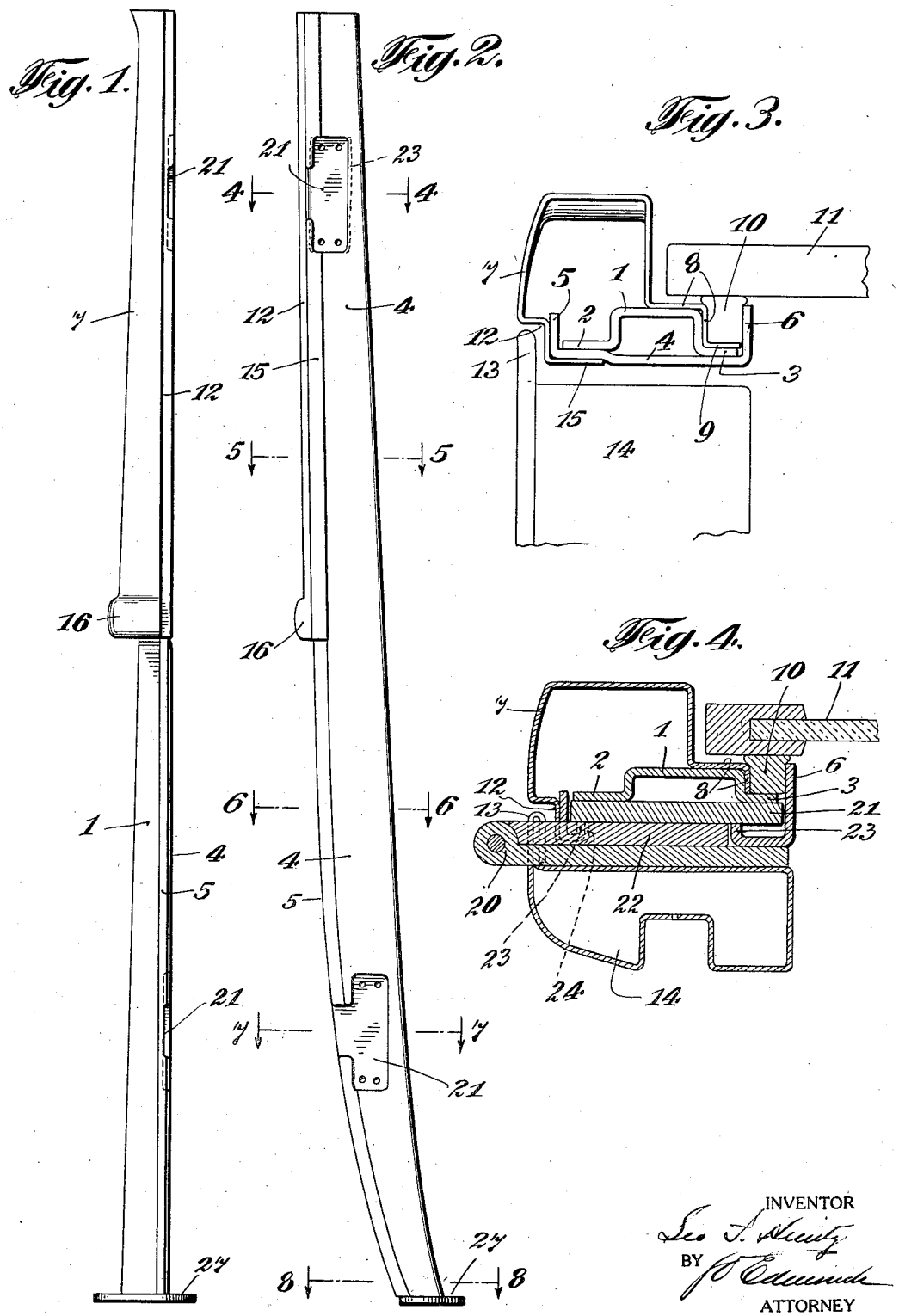

INVENTOR
Leo I. Heintz
BY
ATTORNEY

Patented Sept. 13, 1927.

1,642,368

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

POST CONSTRUCTION FOR VEHICLE BODIES.

Application filed September 16, 1925. Serial No. 56,620.

This invention relates to post construction for vehicle bodies, and more particularly relates to all-metal front corner posts for automobile bodies.

The principal object of this invention is to provide a front corner post for vehicle bodies which is very narrow in the dimension which is presented across the line of vision of the driver of the vehicle, and to provide a post which gives the driver full and clear vision, without interference or obstruction. A further object of this invention is to provide a post which is exceedingly light in weight and one which can be manufactured quickly and inexpensively. Another object of my invention is to provide a post which is sturdy, durable and attractive in appearance. Other objects of this invention will be in part obvious and in part pointed out hereinafter.

The line of vision of a person occupying the driver's seat in an automobile is substantially diagonally through the front corner posts, and in accordance with my invention I construct the corner posts so that the dimension of the posts across the line of vision of the occupant of the driver's seat of the vehicle is narrow, preferably not more than 2½ inches, this being the normal distance between a person's eyes. When the posts are so dimensioned the driver has full and clear vision without interference from the posts. The advantages of the clear vision thus afforded are well understood in the art.

An inexpensive and light all-metal post of this character may comprise, according to this invention, two sheet metal members, rigidly secured together, as by welding, and so shaped as to have the desired sturdiness and rigidity. Preferably both members extend the full height of the post. A suitable panel unit is preferably secured to these members above the belt rail, to give the post a more attractive appearance, and below the belt rail the pillar is preferably provided on its rear surface with a depression to receive the rear edge of the cowl panel of the vehicle, so that the cowl panel may be readily secured to the rear side of the post, which will be flat. Preferably this panel is preformed with a rabbet for the door edge.

In order that a clearer understanding of my invention may be had, attention is hereby directed to the accompanying drawings, forming a part of this application and illustrating one possible embodiment of my invention.

Figure 5:
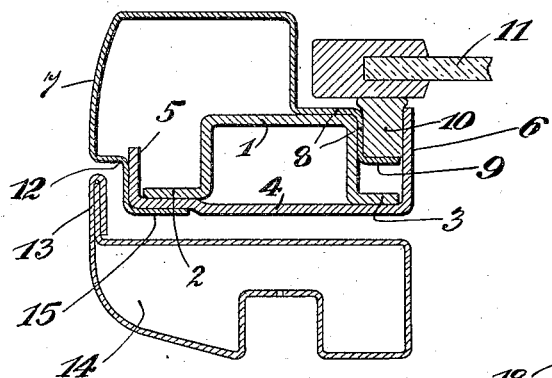
Figure 6:
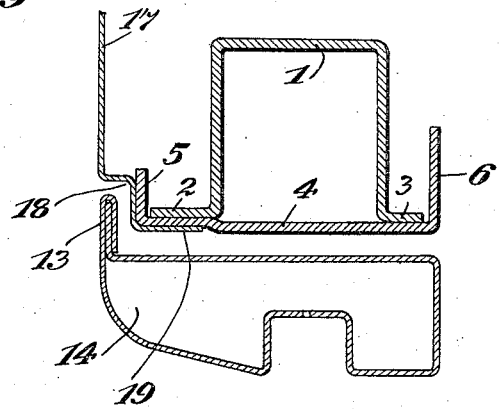
Figure 7:
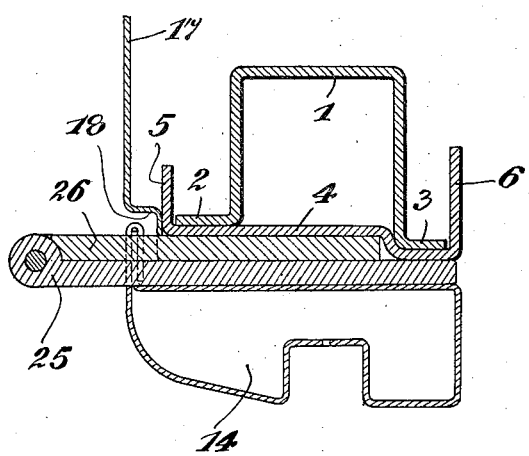
Figure 8:
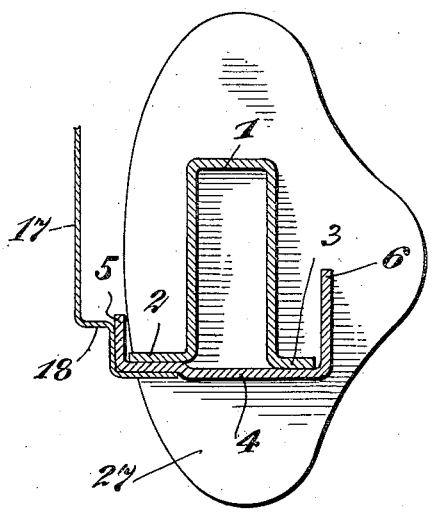

Referring to the drawings, Fig. 1 is a side view of a post embodying my invention; Fig. 2 is a view of the same looking toward another side; Fig. 3 is a top view of the same; and Figs. 4, 5, 6, 7 and 8 are different horizontal sectional views thereof, taken respectively on the lines 4—4, 5—5 6—6, 7—7 and 8—8 of Fig. 2, a fragment of the door also being included in Figs 4, 5, 6 and 7. Similar reference characters refer to similar parts throughout the several views of the drawings.

Referring to the drawings, the post construction comprises a sheet metal, channel-shaped member 1, preferably one-piece, extending the full length of the post and presenting the channel toward the doorway of the vehicle. The side walls of this channel member are flanged outwardly, as at 2 and 3. Extending the full length of the post and covering the channel of member 1 and lying against and secured, preferably by welding, to the flanges 2 and 3, is another sheet metal member 4 of channel shape, which also is preferably one piece. The side walls of this member extend away from the doorway, outside of flanges 2 and 3, as at 5 and 6. It will be noticed that the depth and width of the channel of member 1, and the width of member 4, vary in contour longitudinally, as is clearly brought out in the drawings.

At the upper part of the post, a panel unit 7 is applied to members 1 and 4. This panel unit extends from the belt rail to the upper end of the post. This panel unit is preferably constructed of a single piece of sheet metal shaped to present an attractive appearance at the outer side face and at the front face of the post, and here the panel walls may be offset from the members 1 and 4, as shown. The panel edge at the front of the post has, as shown, an angular portion 8 resting against and secured, as by welding or the like, to the bottom and side wall of the member 1 and has a flange 9, which forms a seat for a cushion or weather strip 10 for the side edge of a conventional wind shield 11. Along the other edge of panel 7 there is a rabbeted portion 12 which, as shown, provides a seat for the upper part of the marginal flange 13 of a door 14. One wall of rabbet 12 lies against and is secured to flange 5 of member 2. At the end of rabbet 12 panel 7 is flanged, as at 15, and this flange lies against and is secured, as by welding, to the side of member 4 which faces the doorway. Preferably, where flange 15 is secured thereto, member 4 is depressed sufficiently to cause the outer surface of flange 15 to lie flush with the outer surface of the main portion of member 4. Thus a flat door jamb surface is provided. At its lower edge panel 7 is preferably shaped to present a bead 16.

Cowl panel 17, at its edge adjacent the post, is preferably provided with a rabbet 18, which accommodates the lower part of marginal flange 13 of the door 14. One wall of rabbet 18 lies against and is welded to flange 5 of member 4. Beyond rabbet 18 panel 17 has a flange 19, which lies against the outer surface of member 4 and is secured thereto, the depression above referred to extending to the bottom of the post to receive flange 19 so that the door jamb surface will be flat.

As shown in Figs. 2 and 4, where the upper door hinge 20 is to be secured to the post, a plate 21 is secured, preferably by welding, to the flanges 2 and 3 of the member 1, and the hinge arm 22 is secured to this plate. Portions of the panel 7 and the member 4 are cut away to accommodate this hinge arm 22, and member 1 is depressed so that the arm 22 will be flush on the jamb surface of the post. About its cut out portion member 4 is flanged over, as at 23, against the outside of plate 21, the panel 7 preferably following the flange toward the outside of the door, as at 24. Where the lower hinge 25 is applied to the post, the edge 15 of panel 17 is cut away, and member 4 and flange 2 of member 1 are depressed so that the hinge arm 26 when secured to member 4 by any suitable means, will be flush with the jamb surface of the post.

A plate or bracket 27 may be secured, by any suitable means, to the bottom of members 1 and 4, whereby the post may be attached to the sill or other frame member of the body.

It will be noted that the wind shield cushion or weather strip 10 is disposed in a retaining channel formed between flange 6 of member 4 and a side wall of channel member 1, and is seated against the flange 9 of panel 7.

It will be apparent from the above that the construction permits the post to be made very narrow in the dimension which is presented across the line of vision of a person in the driver's seat of the vehicle, and thus permits the driver of the vehicle to have full, unobstructed vision, while at the same time this construction may be made of very light and inexpensive materials. The post may be constructed quickly and inexpensively, and, further, since the post permits of the application thereto of paneling, an attractive appearance may be obtained. It will be apparent that the post may be incorporated in various different types of bodies.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. A front corner post for vehicles, comprising, in combination, a metallic member of channel-shape and having lateral flanges, and a second channel-shaped metallic member secured to said lateral flanges, both of said members extending substantially the full height of said post, the side walls of the second member extending across the ends of the lateral flanges and parallel with the side walls of the other member.

2. A front corner post for vehicles, comprising, in combination, a metallic member of channel-shape and having lateral flanges, another metallic member secured to said lateral flanges, and a panel unit secured to said members, said panel unit having a rabbet portion at the outside rear corner of the post for a door edge flange.

3. A front corner post for vehicles, comprising, in combination, a metallic member of channel-shape and having lateral flanges, another metallic member secured to said lateral flanges, and a cowl panel secured to said structure, said panel having a rabbet portion at the outer rear corner of said post.

4. A front corner post for vehicles, comprising, in combination, a one-piece metallic member of channel-shape and having lateral flanges, another one-piece metallic member extending across the channel of the other member and secured to said lateral flanges, both said members extending the full height of the post, a sheet metal upper panel secured to said members at the upper portion of the post, a cowl panel secured to said members at the lower portion of the post, said upper and cowl panels having aligning rabbets at the outside rear corner of the post for a door edge flange.

5. A front corner post for vehicles, comprising, in combination, a metallic jamb wall member, a channel-shaped metallic reenforcing strip secured to said member, a depression along the outer edge of said jamb wall member, and a panel having an edge portion seated in said depression and secured to said jamb wall member, said panel edge portion being flush with the jamb surface of said jamb wall member.

6. A front corner post construction including a channel-shaped jamb wall member, and a channel-shaped reenforcing member secured to the jamb wall member, the side walls of said members being spaced apart at the inside of the post, forming a recess, and a windshield weather strip seated in said recess.

7. A front corner post construction including a channel-shaped jamb wall member, and a channel-shaped reenforcing member secured to the jamb wall member, the side walls of said members being spaced apart at the inside of the post, forming a recess, and a windshield weather strip seated in said recess, and a panel extending about the outside and front of the post and having one edge secured to the jamb wall member at the jamb wall and having its opposite edge seated in said recess behind said weather strip.

8. A front corner post construction including a channel-shaped jamb wall member, and a channel-shaped reenforcing member secured to the jamb wall member, the side walls of said members being spaced apart at the inside of the post, forming a recess, and a windshield weather strip seated in said recess, and a panel extending about the outside and front of the post and having one edge secured to the jamb wall member at the jamb wall and having its opposite edge seated in said recess behind said weather strip, said panel having a rabbet portion for an edge of a windshield.

9. A front corner post construction including a channel-shaped jamb wall member, and a channel-shaped reenforcing member secured to the jamb wall member, the side walls of said members being spaced apart at the inside of the post, forming a recess, and a windshield weather strip seated in said recess, and a panel extending about the outside and front of the post and having one edge secured to the jamb wall member at the jamb wall and having its opposite edge seated in said recess behind said weather strip, said panel having a rabbet portion for an edge of a windshield and having a rabbet portion for a door edge flange.

This specification signed this 12th day of September, 1925.

LEO I. HEINTZ.